US006454058B1

(12) United States Patent
Ballinger et al.

(10) Patent No.: US 6,454,058 B1
(45) Date of Patent: Sep. 24, 2002

(54) DISC BRAKE ROTOR

(75) Inventors: Robert S. Ballinger, West Chester; Kenneth B. Dunlap, Springfield; Michael A. Riehle, West Chester, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/754,688

(22) Filed: Jan. 3, 2001

(51) Int. Cl.[7] .................... F16D 65/12; F16D 65/847
(52) U.S. Cl. .................. 188/218 XL; 188/264 AA; 188/71.6
(58) Field of Search ............... 188/218 XL, 73.2, 188/264 A, 264 AA, 71.6, 218 A, 18 A; 192/70.12, 107 R, 113.2, 113.23; 301/6.8, 6.3, 6.1

(56) References Cited

U.S. PATENT DOCUMENTS

| | | | | |
|---|---|---|---|---|
| 2,603,316 A | * | 7/1952 | Pierce ................... | 188/218 XL |
| 2,627,325 A | * | 2/1953 | Helsten ................. | 188/218 XL |
| 3,171,527 A | * | 3/1965 | Ott ....................... | 188/218 XL |
| 3,298,476 A | * | 1/1967 | Day ...................... | 188/218 XL |
| 3,394,780 A | * | 7/1968 | Hodkinson | |
| 4,379,501 A | * | 4/1983 | Hagiwara et al. ...... | 188/218 XL |
| 4,523,666 A | * | 6/1985 | Murray ................. | 188/218 XL |
| 4,638,891 A | * | 1/1987 | Wirth .................... | 188/264 A |
| 5,161,652 A | * | 11/1992 | Suzuki ................. | 188/218 XL |
| 5,427,212 A | * | 6/1995 | Shimazu et al. ...... | 188/218 XL |
| 5,460,249 A | * | 10/1995 | Aoki ...................... | 188/264 A |
| 5,492,205 A | * | 2/1996 | Zhang .................. | 188/264 AA |
| 5,542,503 A | * | 8/1996 | Dunn et al. ........... | 188/218 XL |
| 5,544,726 A | * | 8/1996 | Topouzian et al. ...... | 188/264 A |
| 6,053,290 A | * | 4/2000 | Goddard ............... | 188/218 XL |
| 6,119,820 A | * | 9/2000 | Steptoe et al. ............. | 188/71.6 |
| 6,193,023 B1 | * | 2/2001 | Telfer ........................ | 188/71.6 |
| 6,216,827 B1 | * | 4/2001 | Ichiba et al. ............... | 188/73.2 |
| 6,260,699 B1 | * | 7/2001 | Daudi ........................ | 188/71.6 |
| 6,325,185 B1 | * | 12/2001 | Doi et al. ............. | 188/218 XL |

FOREIGN PATENT DOCUMENTS

| | | | |
|---|---|---|---|
| GB | 2144186 | * | 2/1985 |
| JP | 56164237 | * | 12/1981 |
| JP | 5240276 | * | 9/1993 |
| JP | 11257386 | * | 9/1999 |

* cited by examiner

Primary Examiner—Douglas C. Butler
(74) Attorney, Agent, or Firm—Scott A. McBain

(57) ABSTRACT

A disc brake including a pair of friction plates arranged coaxially in a parallel, spaced-apart relationship and a plurality of vanes extending between the pair of friction plates, each of the vanes having a proximal end, a distal end and a mid-portion extending between the proximal end and the distal end, the proximal ends of a plurality of the vanes having a first width, the mid-portion having a second width, the first width being substantially greater than the second width. The vanes can include a T-shaped portion adjacent the proximal end.

5 Claims, 3 Drawing Sheets

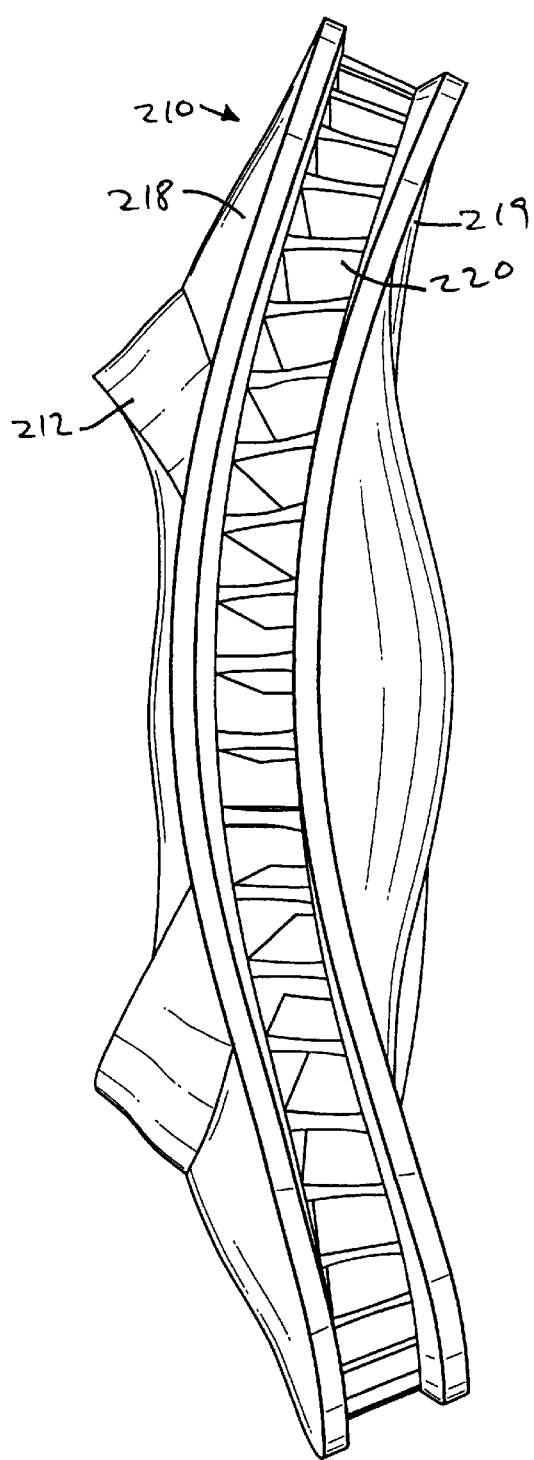 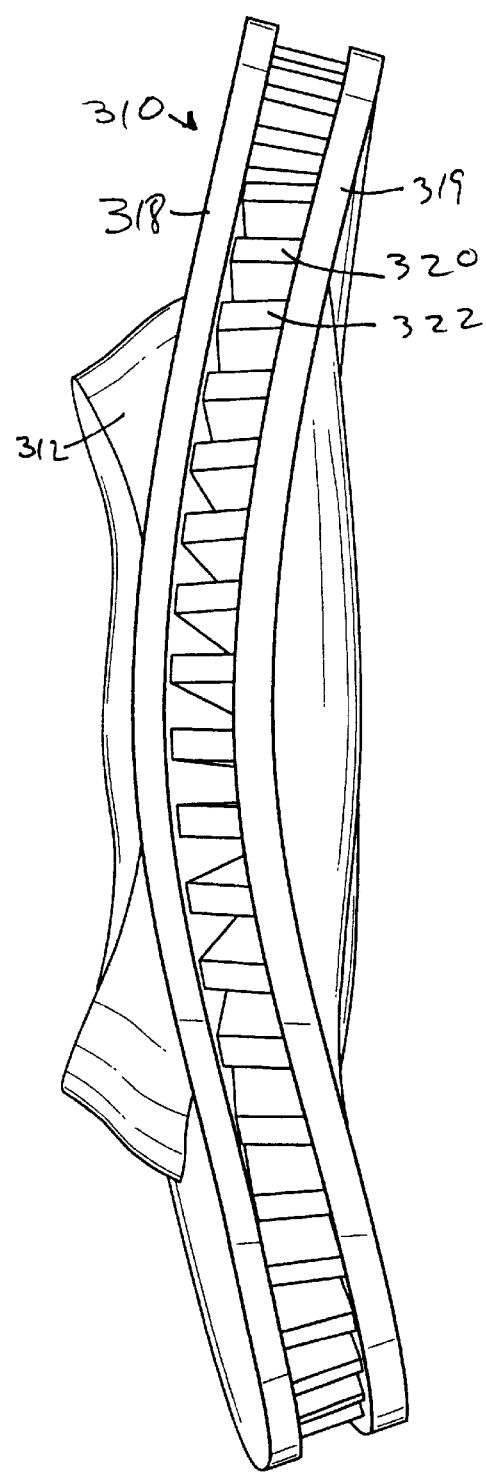
Fig. 3
PRIOR ART
Fig. 4

DISC BRAKE ROTOR

TECHNICAL FIELD

The present invention relates generally to disc brake rotors as used in a vehicle braking system. More particularly, the invention relates to a vehicle brake rotor that incorporates a plurality of vanes designed to reduce noise generated in the brake system.

BACKGROUND OF THE INVENTION

Noise generated during a brake application has been increasing as the size of vehicles has been decreasing. Attempts have been made to reduce the noise generated using various systems and methods. One such technique involves the use of sound adsorption coatings on the pad assembly. While such coatings have some effectiveness, the addition of the coating adds cost to the manufacture and at times, undesirable noise occurs when the thickness of the coating has not been uniform.

Another technique involves a disc brake pad assembly having clench tabs extending through rubber-like grommets in openings in a caliper housing leg so that the grommets are retained in the openings and the brake pad assembly is retained on the housing leg. The grommets provide a noise dampening action during braking to reduce noise.

Individual noise problems have been reduced through the modification of the ingredients in the composition of materials that make up a brake pad. In many of these cases, while noise may have been abated somewhat, the braking effectiveness of the system has been changed by the modification of the brake pad material, Still another technique of reducing brake noise involves affixing a ring damper about a periphery of a brake rotor in a disc brake system. The ring damper is held in place by a groove formed in the periphery of the disc and is pre-loaded against the rotor both radially and transversely.

The above techniques involve the reduction of noise by absorbing or masking the noise after it has been created or by adding costly complexity to the braking system. It would be advantageous to design the system to reduce the potential for the creation of noise. It has been suggested that much of brake squeal or noise is influenced by the excitation of the natural frequencies of a rotor caused by the rubbing of friction pads on a rotor surface. There is evidence that a disc brake rotor may have a dozen or more naturally occurring frequencies. While most of these are in the axial direction, others are in the torsional direction. In simulated braking applications only certain of these natural frequencies create brake noise or squeal. Every natural frequency of a vibrating system has associated with it a mode shape that describes the pattern of deformation associated with that natural frequency. In a continuous structure, the mode shape is generally accepted or described by defining the pattern of nodes (loci of points of zero deformation) on the surface of the structure. Experiments have shown that the mode shape of an annular circular plate, a shape like that of a brake rotor, includes nodal circles and diameters. Thus, a beneficial effect on brake noise should be attainable if the nodal diameter modes of an installed disc rotor are maintained at a maximum separation, thereby reducing or eliminating coupling of the nodal diameter modes in the audible frequency range.

A typical structure of a brake rotor includes a central disc portion that is adapted to be mounted to an axle of a vehicle as in known in the art, by fasteners. An extending portion typically connects one of a pair of rotor friction plates or cheeks to the central disc portion. An outboard plate is the portion of the rotor that includes a friction surface attached to the central disc portion adjacent to the wheel and faces outward from the vehicle body. An inboard plate faces inward toward the vehicle body.

A plurality of vanes extend from an inner surface of the first or outboard plate to connect a second inboard plate thereto. The vanes are typically arranged in a radial fashion about the rotor. The vanes hold the first and second plates in a parallel, side-by-side relationship. Typically, vanes have an overall regular elongate, rod, coffin or rectangular shape with a generally constant width and cross-sectional area. In other words, many current vanes start out a rectangular cross-section at one end and remain rectangular throughout the longitudinal distance of the vane at an opposite end. Similarly, a prior-art plate typically has a thickness or cross-section remaining substantially constant along the radial direction.

A rotor may possess a number of inherent resonance modes. In use, the rotor may generate vibrations including a mode characterized by radial (and potentially transverse and some tangential) displacement of the plates of the rotor. Further, the rotor may generate vibrations in a mode referred to as an X-mode, characterized by mainly transverse (with some radial and tangential) displacement of the plates of the rotor. A transverse modal vector is defined by one nodal diameters at the friction radius of the rotor and X order nodal diameters defined by the number of transverse antinodes. Coupling of a radial and an X-mode in a rotor results in a hybrid mode vibration. In a hybrid mode, one plate exhibits radial mode behavior and the other plate exhibits X-mode behavior.

It would be advantageous to provide an apparatus and method to prevent the occurrence of hybrid mode behavior in a disc brake rotor.

SUMMARY OF THE INVENTION

An aspect present invention provides a rotor for a disc brake including a pair of friction plates arranged coaxially in a parallel, spaced-apart relationship and a plurality of vanes extending between the pair of friction plates. The vanes have a proximal end, a distal end and a mid-portion extending between the proximal end and the distal end. The proximal end of a plurality of the plurality of vanes include a first width, the mid-portion including a second width, the first width being substantially greater than the second width.

Other aspects of the present invention provide a rotor wherein the first width of half the vanes is substantially greater than the second width. The first width of the other half of the vanes can be substantially the same as the second width. The first width of at least half the vanes can be from about 50 percent greater than the second width to about twice that of the second width.

In another aspect of the invention, a plurality of the plurality of vanes can include an inverted T-shaped portion adjacent the proximal end of the vanes. Half of the vanes can include an inverted T-shaped portion adjacent the proximal end of the vanes. The inverted T-shaped portion is at least 50% wider than a width of the mid-portion. The rotor may further include an angled portion located between each inverted T-shaped portion and the mid-portion.

An aspect of the present invention provide a method of reducing noise in a disc brake rotor including stiffening a radially inner portion of the brake rotor with a proximal portion of a plurality of vanes and reducing hybrid vibration modes in an audible frequency range. The proximal portion of the plurality of vanes can include an inverted T-shaped portion. Half of the plurality of vanes can include an inverted T-shaped portion at a proximal portion. The other half of the plurality of vanes can include a substantially constant width from a proximal portion to a distal portion of the vanes.

Another aspect of the present invention provides a rotor for a disc brake including means for stiffening a radially inner portion of the brake rotor with a proximal portion of a plurality of vanes and means for reducing hybrid vibration modes in an audible frequency range. The proximal portion of the plurality of vanes can include an inverted T-shaped portion. Half of the plurality of vanes can include an inverted T-shaped portion at a proximal portion. The other half of the plurality of vanes can include a substantially constant width from a proximal portion to a distal portion of the vanes.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 3 illustrates a prior art rotor exhibiting deformation generated by a hybrid mode coupling of radial and X-modes of vibration; and FIG 4 illustrates an embodiment of the present invention exhibiting less deformation than the rotor of FIG. 3.

DESCRIPTION OF THE PREFERRED EMBODIMENT

Figure 1:
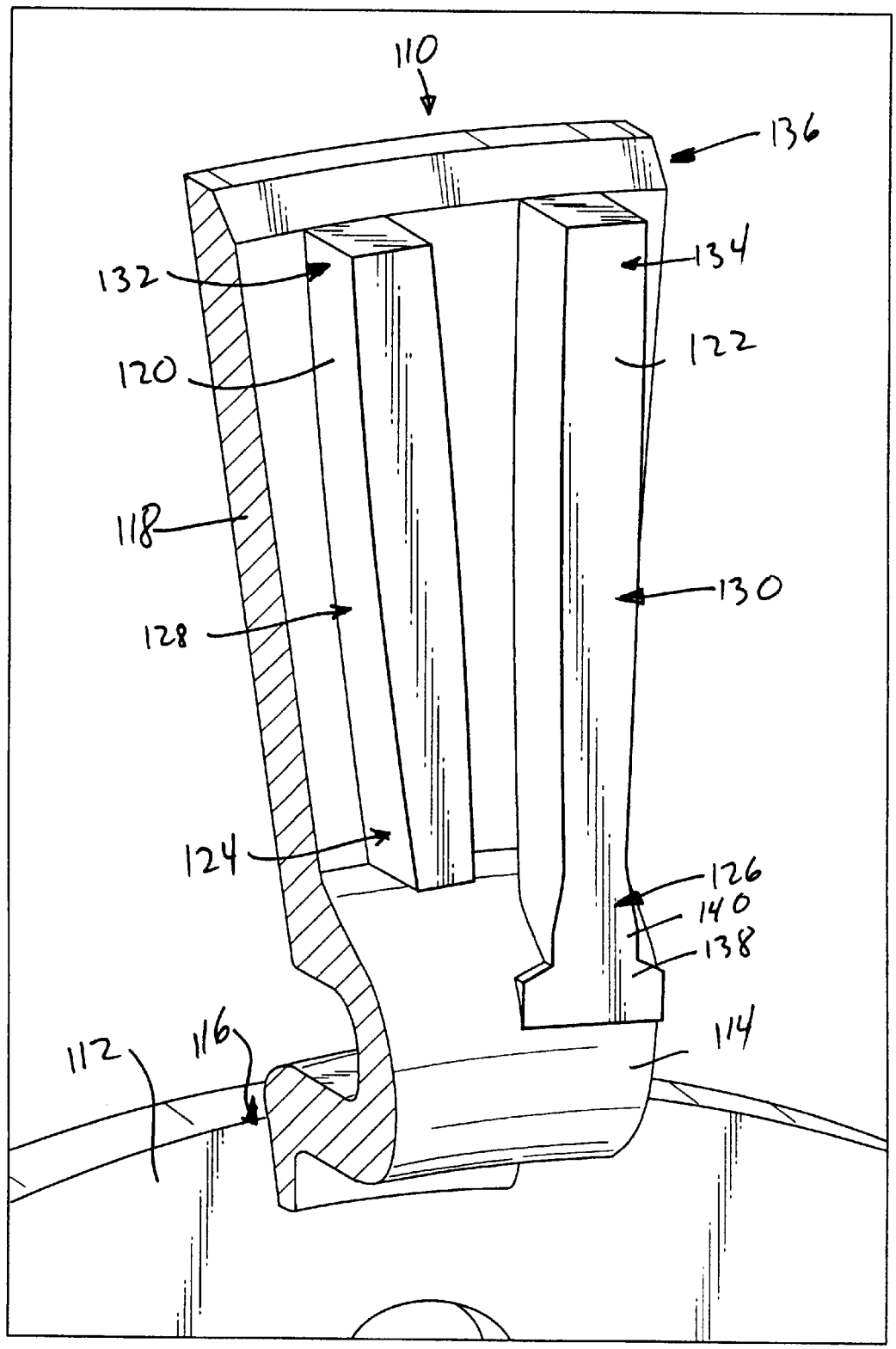
FIG. 1 illustrates a perspective view of an embodiment of a brake rotor of the present invention including inverted T-shaped vanes.

Referring to FIG. 1 one embodiment of a brake rotor is generally shown at numeral 110. The brake rotor 110 includes a central attachment portion 112. An extending portion 114 is attached adjacent to the periphery 116 of the central attachment portion 114. A first friction plate 118 (one of a pair of parallel friction plates) is depicted attached to the central attachment portion 112 by the extending portion 114. A second friction plate (not shown), which would be oriented in a parallel, spaced apart relationship to the first plate 118 is omitted to show the structure (vanes) therebetween. A plurality of vanes 120, 122 is provided that extend between the plates and are arranged in a radial fashion. The vanes 120, 122 are radial members, each having a proximal end 124, 126 adjacent the extending portion 114 and a middle span or mid-portion 128, 130 that extends longitudinally in a radial direction to a distal end 132, 134. The distal end 132, 134 is located adjacent the outer periphery 136 of the friction plates.

In one embodiment, a first and a second set of vanes 120, 122 are provided between the plates in an alternating arrangement. In other words, a first vane 120 is followed by an adjacent second vane 122, which is followed by a first vane 120 and so on, around the rotor 110. Each of the first set of vanes 120 has a generally constant width rectangular shape from proximal end 124 to distal end 132. Each of the second vanes 122 has an inverted T-shape configuration. The inverted T-shaped portion 138 is located in the proximal end 126 of the vane 122. The middle span 130 of the vane 122 is essentially a longitudinally extending rectangular portion. The vane 122 can include an angled portion 140 between the middle span 130 and the inverted T-shaped portion 138. The inverted T-shaped portion 138 of the vane 122 can have a width about 50% greater than that of the middle span 130 of the vane 122. The inverted T-shaped portion 138 of each vane 122 can have a width about twice that of the middle span 130 of the vane 122. Also, the width of portion 138 can be made from about 50% greater to about twice that of the middle span 130 of the vane 1220.

Figure 2:
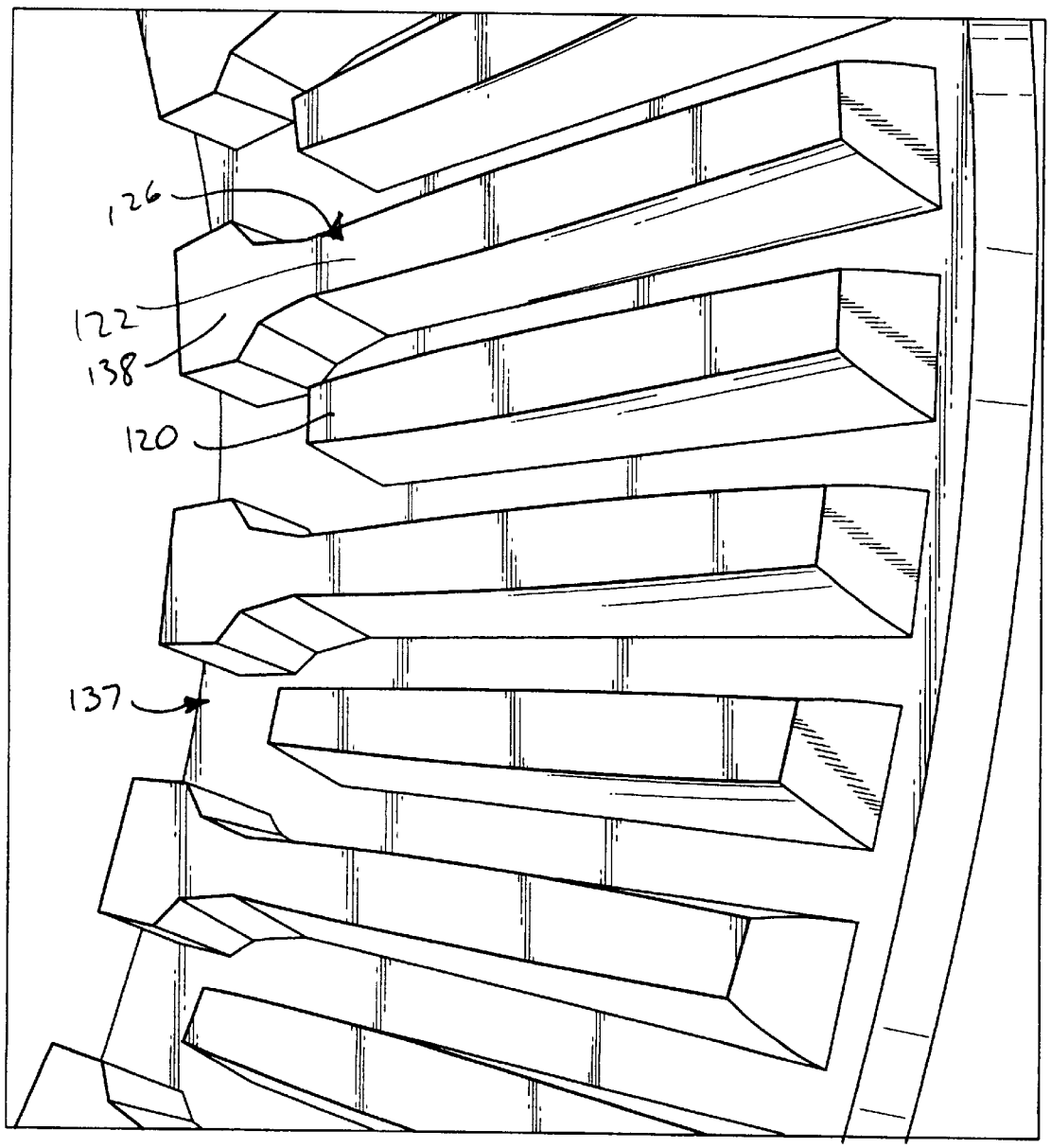
FIG. 2 illustrates an alternating arrangement of the vanes in the brake rotor of FIG.1.

Referring to FIGS. 1 and 2, in an alternating configuration about the rotor 110 are the first vanes 120 and the second vanes 122. The first vanes 120 can lack the inverted T-shaped configuration of the proximal portion 126 of the second vanes 122. The widened portion or inverted T-shaped portion 138 of vanes 122 can add stiffness to the inner diameter or inner periphery 137 of the rotor 110. This configuration may provide a beneficially modified pattern of nodal resonance modes.

Referring to FIG. 3, a depiction of a prior art rotor is generally shown at 210. The rotor 210 includes a central hat or disc portion 212. An outer plate 218 is connected to the central hat portion 212. Inner plate 219 is connected to the outer plate 218 by a plurality of conventional vanes, one of which is shown at 220. In this illustration, the rotor 210 is shown (exaggerated) exhibiting a hybrid mode deformation including $2^{nd}$ radial mode and $2^{nd}$ X-mode deformation.

Referring to FIG. 4, an embodiment of the present invention includes a rotor depicted in a similar view as that shown in FIG. 3. The rotor 310 includes a central hat or disc portion 312. An outer plate 318 is connected to the central hat portion 312. Inner plate 319 is connected to the outer plate 318 by first plurality of vanes, one of which is indicated at 320 and a second plurality of vanes 322. The vanes 322 may include the inverted T-shaped configuration shown in FIGS. 1 and 2. Compared to the prior art rotor of FIG. 3, the rotor of the present invention (depicted in FIG. 4) exhibits less deformation, and thus a lower amplitude or amount of overall vibration.

As discussed above, a rotor possesses a number of nodal diameter and circle modes. Each of the nodal modes generates a different pattern of resonant rotor vibration. When the $n^{th}$ nodal diameter mode (radial) converges or couples near the same frequency with the one nodal circle mode X-mode), noise is often produced. The convergence of the radial and X-modes produces a hybrid mode shape than contains a contribution from each mode shape. The character of the hybrid mode shape includes one rotor cheek or plate being a radial mode shape and the other rotor cheek being a nodal diameter/nodal circle mode shape. The radial mode content of the hybrid mode receives energy from the tangential forces of the brake linings. The radial mode couples with the nodal circle/nodal diameter mode content to produce out-of-plane motion. This is the mechanism by which the hybrid mode can cause brake noise or squeal. In operation, the inverted T-shape vane design increases the stiffness of the nodal circle/nodal diameter modes, thereby moving their frequencies higher in the spectrum than the radial modes. The inverted T-shape vanes reduces or eliminates the hybrid coupling of these modes.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A rotor for a disc brake comprising:

a pair of friction plates arranged coaxially in a parallel, spaced-apart relationship;

a plurality of inverted T-shaped vanes extending between the pair of friction plates, each of the inverted T-shaped vanes having a proximal end, a distal end, an angular portion and a mid-portion extending between the angled portion and the distal end, the proximal end of the T-shaped vanes having a first width greater than a second width of the mid-portion, the proximal end adjacent an extending portion of the friction plates and the distal end adjacent an outer periphery of the friction plates; and a plurality of substantially rectangular vanes extending between the pair of friction plates, each of the rectangular vanes having a proximal end, a distal end and a mid-portion extending between the proximal end and the distal end, the proximal end being parallel to the distal end, the distal end adjacent an outer periphery of the friction plates and wherein the rectangular vanes extend a length less than a length of the T-shaped vanes;

wherein the plurality of inverted T-shaped vanes and the plurality of generally rectangular vanes are arranged radially in an alternating pattern between the pair of friction plates.

2. The rotor of claim 1 wherein the plurality of substantially rectangular vanes have a third width substantially the same as the second width of the T-shaped vanes.

3. The rotor of claim 1 wherein the first width of the T-shaped vanes is at least about 50 percent greater than the second width of the T-shaped vanes.

4. The rotor of claim 1 wherein the first width of the T-shaped vanes is at least about 50 percent to at least about twice that of the second width of the T-shaped vanes.

5. The rotor of claim 1 wherein the cross-section of the plurality of inverted T-shaped vanes and the plurality of substantially rectangular vanes is trapezoidal.

* * * * *